United States Patent [19]
Roberts et al.

[11] Patent Number: 4,854,931
[45] Date of Patent: Aug. 8, 1989

[54] PROCESS AND APPARATUS FOR DISPENSING AND CONVEYING INDIVIDUAL ARTICLES IN SERIATIM ORDER

[75] Inventors: John T. Roberts, Clover, S.C.; Larry J. Mattson, Matthews, N.C.

[73] Assignee: Poly-Pro, Inc., Charlotte, N.C.

[21] Appl. No.: 71,486

[22] Filed: Jul. 9, 1987

Related U.S. Application Data

[63] Continuation-in-part of Ser. No. 421,859, Sep. 23, 1982, abandoned, and a continuation-in-part of Ser. No. 688,542, Mar. 29, 1985, Pat. No. 4,662,974.

[51] Int. Cl.⁴ ................................................ B05B 1/14
[52] U.S. Cl. ...................................... 493/348; 83/417; 493/223; 493/226; 493/926; 493/935
[58] Field of Search ............... 493/223, 226, 348, 372, 493/926, 935; 227/48, 99, 103, 112; 221/30; 83/149, 150, 417

[56] References Cited

U.S. PATENT DOCUMENTS

| 2,939,147 | 7/1958 | Jacobson . | |
| 3,165,968 | 7/1962 | Anstett . | |
| 3,270,874 | 8/1965 | Hilton . | |
| 3,307,440 | 3/1967 | Hoyt | 83/150 |
| 3,357,761 | 10/1965 | Langas et al. . | |
| 3,698,289 | 10/1972 | Kamins et al. | 493/226 |
| 3,818,811 | 6/1974 | Kleinhaut et al. | 493/226 |
| 3,933,064 | 1/1976 | Schoppee | 83/417 |
| 4,596,543 | 6/1986 | Reiser et al. | 493/313 |
| 4,662,974 | 5/1987 | Roberts | 156/344 |
| 4,704,100 | 11/1987 | Kaufman | 493/926 |

FOREIGN PATENT DOCUMENTS

359144 12/1972 U.S.S.R. ................... 83/150

Primary Examiner—Frederick R. Schmidt
Assistant Examiner—Robert Showalter
Attorney, Agent, or Firm—John B. Hardaway, III

[57] ABSTRACT

A method and apparatus wherein individual plastic articles are sheared from a cartridge of such articles and conveyed mechanically through an inserter arm to a desired position.

5 Claims, 4 Drawing Sheets

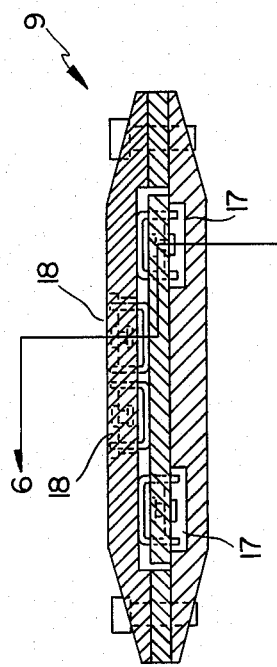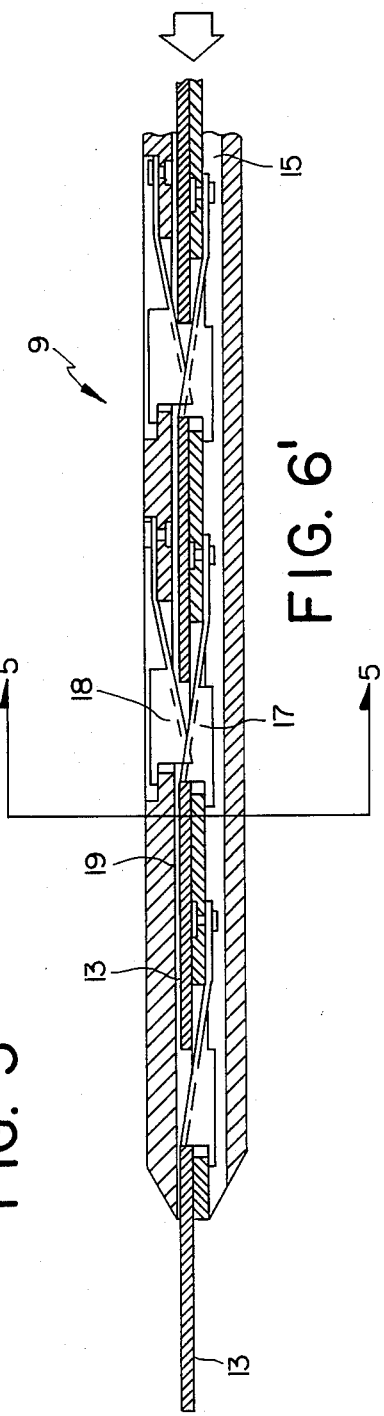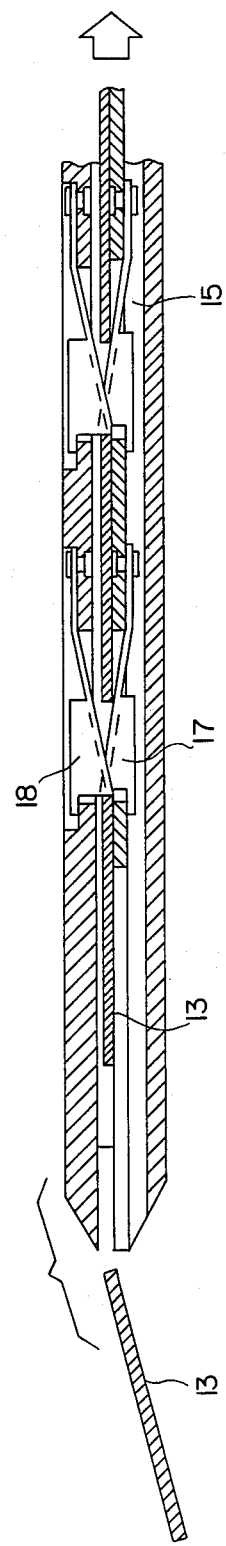

PROCESS AND APPARATUS FOR DISPENSING AND CONVEYING INDIVIDUAL ARTICLES IN SERIATIM ORDER

This application is a continuation-in-part of application Ser. No. 06/421,859 filed Sept. 23, 1982, now abandoned and Ser. No. 06/688,542, filed Mar. 29, 1985, now U.S. Pat. No. 4,662,974, dated May 5, 1987.

BACKGROUND OF THE INVENTION

This invention relates generally to the art of dispensing and more particularly to an apparatus for dispensing and conveying plastic articles.

Dispensing of articles in automatic fashion has been of significant interest in the transition from manual processing to machine processing of various items. Dispensing techniques have been particularly well-developed in the area of packaging. Examples of such technology include the automatic dispensing of plastic bags, one at a time, by having such bags arranged in a shingled relationship along a taped carrier. Additionally, such arrangement is to facilitate the dispensing of such bags utilizing automated equipment.

Associated with such technology in the packaging art are various items of rigid plastic material which must be dispensed one at a time in order to have some association with a bag or a packaged article.

One such device is described in U.S. Pat. No. 3,270,874 to Hilton where individual plastic bag closures such as the type normally used on bread packages are arranged together in a unitary, side-by-side relationship with scores between individual articles to facilitate the severance of individual articles from the unitary strip. Such articles are severed by merely bending the strip at the point of score. This product is arranged primarily for manual dispensing.

A dispensing mechanism is described in U.S. Pat. No. 2,939,147 to Jacobson, wherein curtain hooks are arranged for automatic dispensing, one at a time, such that the clips are stacked together and connected together by a spline which maintains the hooks in the stacked relationship and facilitates loading into a magazine where they are dispensed one at a time from the stack.

Another dispensing device is described in U.S. Pat. No. 3,165,968 to Anstett wherein a plastic nailing strip is utilized to connect together individual nail articles for the purpose of dispensing the articles one at a time with automated equipment. A similar device is described in U.S. Pat. No. 3,357,761 to Lagas et al.

In facilitating the marketing of retail items, it has been known in the prior art to utilize rigid thermoplastic hooks or hanger attachments to individual articles for displaying such articles in a retail environment. In the past, such hooks have been dispensed from a loose cartridge for stapling or other means of attachment to a marketable item. Such individual hooks have been arranged within magazines manually in loose stacks. Such arrangement has required great skill on the part of the operator in order to assure loading of large numbers of such hooks in a stacked relationship. Essentially, such loading requires movement of large numbers of hooks within a stack by utilizing only hand pressure at both ends to maintain the stack in alignment, while hoping that the central area of the stack did not collapse to produce a disoriented array of hooks which must be again manually restacked for purposes of loading into a dispensing magazine.

In the art of producing plastic bags with hooks therein, various devices have been utilized. Such are disclosed in U.S. Pat. Nos. 3,429,498, 3,777,970, 3,782,622, and 4,385,722.

There is disclosed in U.S. Pat. No. 4,590,610 to Rhyne, a process of producing a bag having a hook therein. The bag thus produced has a plurality of seals to permit article insertion and inspection.

While these prior art processes of dispensing conveying and of forming bags with hooks therein are efficacious, there is significant room for advancement in the art.

SUMMARY OF THE INVENTION

It is thus an object of this invention to provide an improved process and apparatus for dispensing plastic articles.

It is a further object of this invention to provide an improved process and apparatus for dispensing and conveying such articles wherein the articles may be hooks.

It is a further and yet more particular object of this invention to provide an improved process for dispensing and conveying hooks for positioning within plastic film to form a hanging bag therefrom.

These as well as other objects are accomplished by a method and apparatus wherein individual plastic articles adhered to one another in a stacked cartridge are continuously sheared from said cartridge of such articles and conveyed mechanically through an inserter arm to a desired position.

BRIEF DESCRIPTION OF THE DRAWINGS

FIG. 5 of the drawings is a view along the line 5—5 of FIG. 6'.

FIG. 6' of the drawings is a view along the line 6—6 of FIG. 5.

FIG. 6" of the drawings is a view similar to FIG. 6' in a different sequence of operation.

DETAILED DESCRIPTION

In accordance with this invention, it has been found that plastic articles may be dispensed and precisely conveyed utilizing a magazine of such articles from which the articles are sheared within an inserter arm for precise positioning by conveying through the inserter arm.

It has additionally been further found that slits may be cut in plastic film for the formation of hanging bags from such plastic film. Various other advantages and features will become apparent from a reading of the following description given with reference to the various figures of the drawings.

Figure 1:
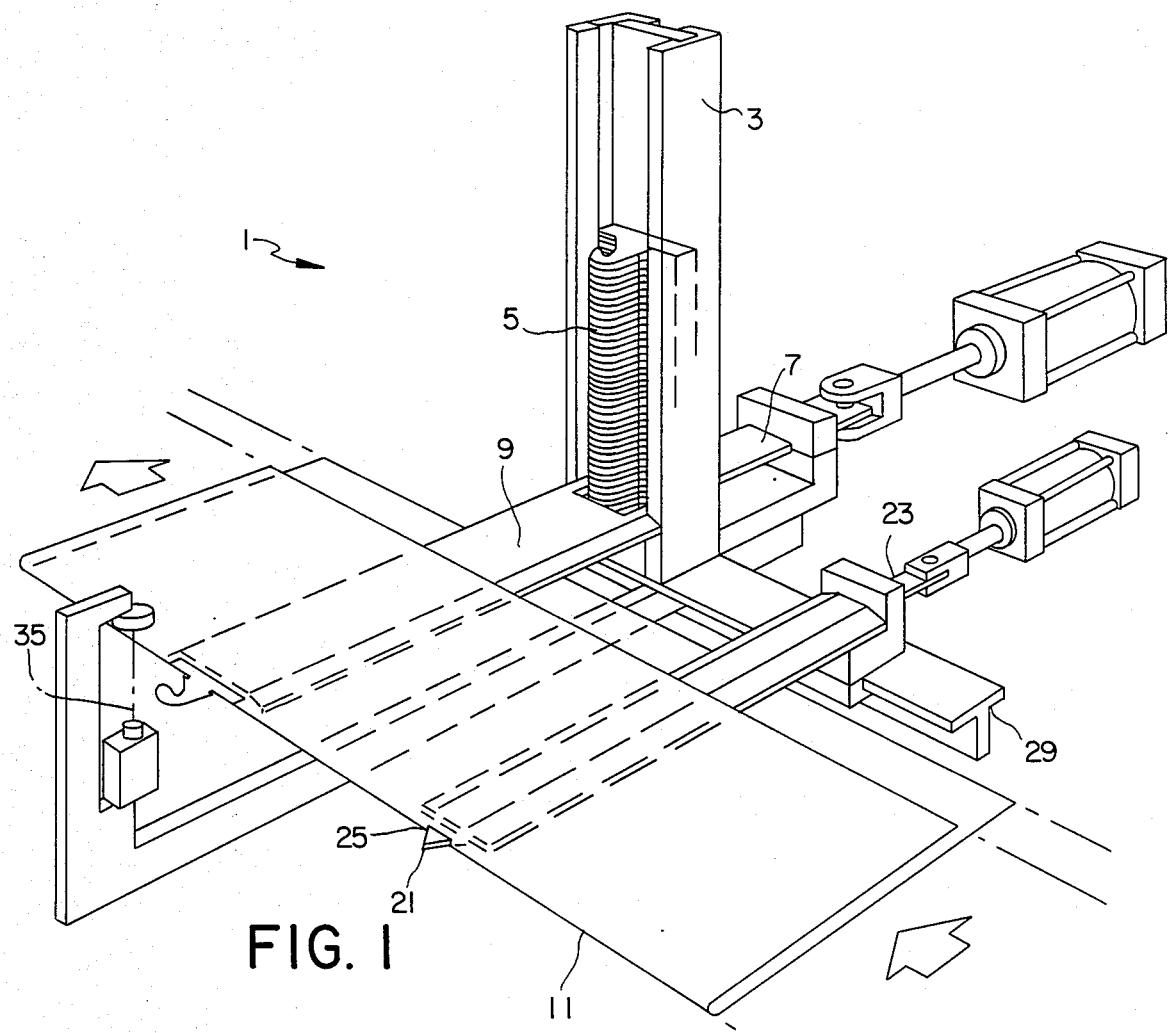
FIG. 1 of the drawings is a perspective view of the apparatus in accordance with this invention.
Figure 2:
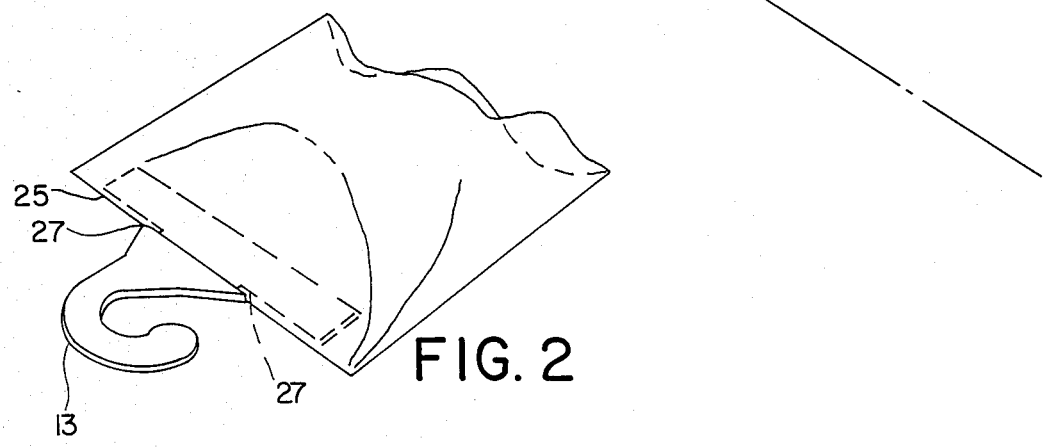
FIG. 2 of the drawings is a partial breakaway view illustrating a result of this invention.

FIG. 1 of the drawings illustrates an apparatus 1 in accordance with this invention. Generally, the apparatus comprises a magazine 3 for retaining a cartridge 5 of individual plastic articles. Preferably, the cartridge 5 is of the type described in my copending applications wherein the individual plastic articles are fused to form a cartridge for dispensing purposes. Magazine 3 is associated with a shearing blade 7 which will be further described below. Blade 7 shears individual articles from the bottom of cartridge 5 for positioning within inserter arm 9. The individual articles are mechanically pushed through the length of the inserter arm and are inserted into the plastic film 11 at the other end. FIG. 2 of the drawings is a breakaway view of a portion of FIG. 1 illustrating a hook 13 appropriately positioned.

Figure 3:
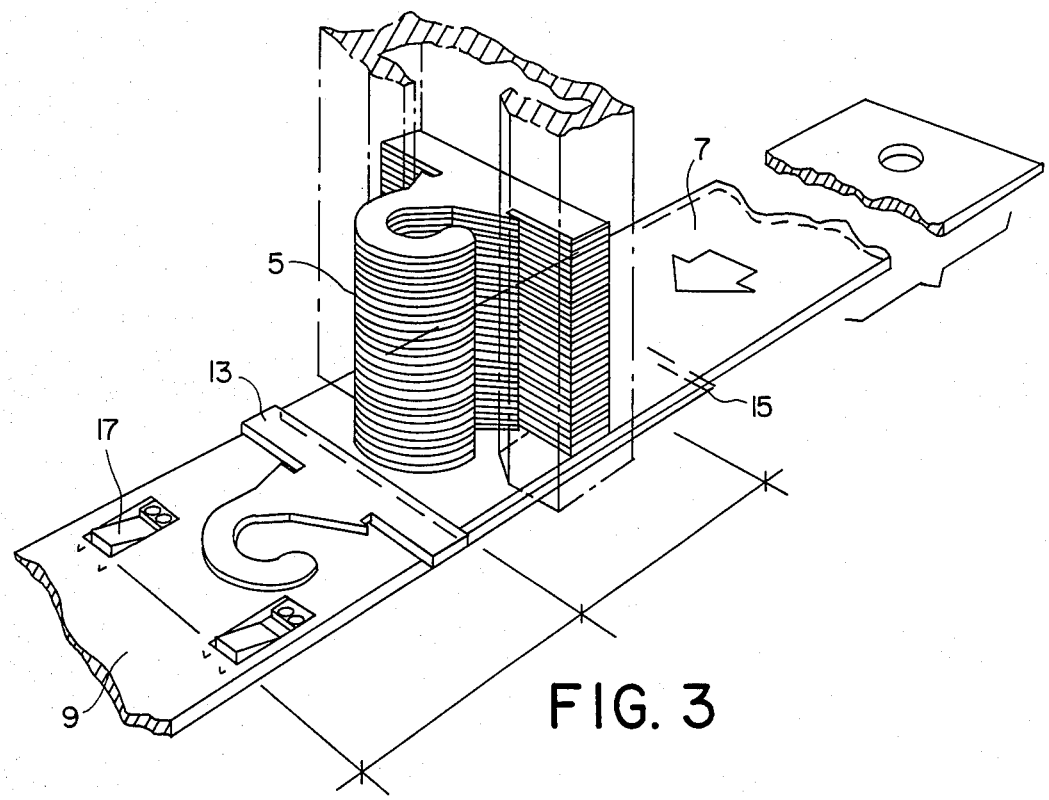
FIG. 3 of the drawings is a cutaway perspective view of a portion of FIG. 1.

The means by which the individual articles are pushed through the length of the inserter arm is best illustrated by FIGS. 3, 6' and 6". FIG. 3 illustrates blade 7 as it shears an individual article 13 from the bottom of cartridge 5 and positions it within inserter arm 9. Attached to the shearing blade 7 is sub-blade 15.

Figure 4:
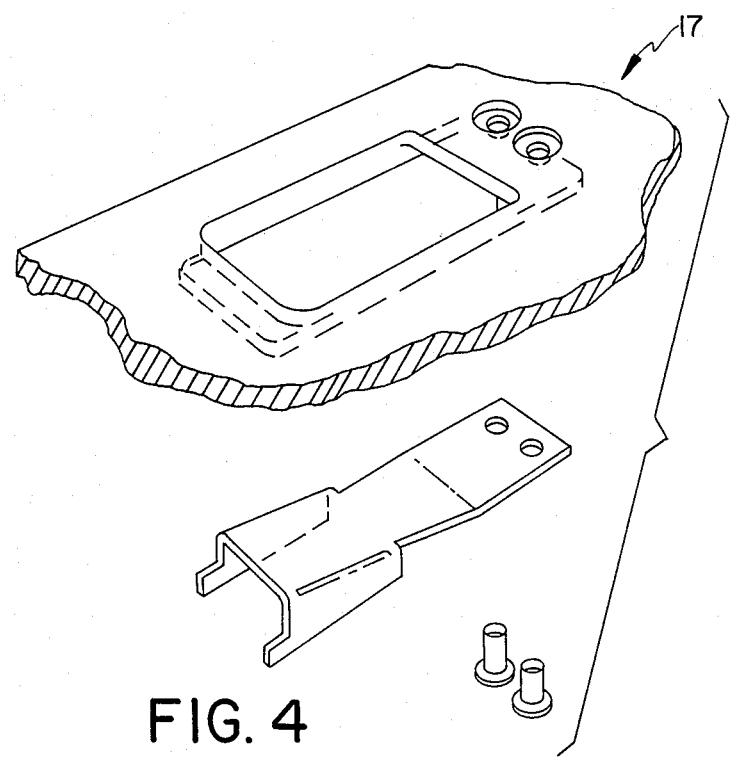
FIG. 4 of the drawings is a perspective assembly view of a portion of FIG. 3.

Positioned along sub-blade 15 are a series of ratchet-spring "pushers" 17. The assembly of the ratchet-spring "pushers" 17 is best illustrated in FIG. 4. Of similar design are the ratchet-spring "stoppers" 18 which protrude downwardly from the cover 19 as shown in FIGS. 5, 6' and 6". The ratchet-spring "pushers" 17 serve as a mean for advancing individual articles through the inserter arm 9 each time the sub-blade 15 moves forward. The ratchet-spring "stoppers" 18, FIG. 5, serve as a means for restraining individual articles in the inserter arm each time the sub-blade 15 retracts. The ratchet-spring "pushers" 17 and ratchet-spring "stoppers" 18 are spaced at increments approximately the length of one article 13.

The operation of the apparatus will now be described. Shearing blade 7 shears from cartridge 5 article 13 and advances it one increment of its own length. Ratchet-spring "stoppers" 18 protruding down from cover 19 hold article 13 as shearing blade 7 and sub-blade 15 attached to shearing blade 7 retract. Shearing blade 7 then shears the next individual articles from cartridge 5 and, as shearing blade 7 moves forward, the ratchet-spring "pushers" protruding up from sub-blade 15 advance article 13 one more increment of its own length. As shearing blade 7 and sub-blade 15 retract, article 13 and the newly sheared article are held in place by ratchet-spring stoppers 18. This cycle continues for each individual article until it is moved the entire distance of inserter arm 9 and dispensed from the inserter arm 9. Inserter arm 9 may be designed to move each article any number of increments before dispensing.

A significant advantage of the apparatus of this invention is that once shearing blade 7 has sheared enough articles to fill the length of inserter arm 9, articles are dispensed with each forward motion of shearing blade 7. As the range of motion of shearing blade 7 only approximates the length of one article 13 rather than the length of inserter arm 9, articles are dispensed very quickly with a minimum of mechanical motion. In other words, if inserter arm 9 holds four articles at any given time after start-up (that is, each individual article must move five times its own length to be dispensed) the shearing blade is only moving one-fifth as far as it would have to if it were actually pushing each article the entire length of the inserter arm. Articles can thus be dispensed five times as fast without increasing the speed of the shearing blade.

FIG. 5 shows the lateral arrangement of the two sets of ratchet springs 17 and 18 within the inserter arm 9. FIG. 6' the sub-blade 15 in the forward position and FIG. 6" shows the sub-blade 15 in the retracted position.

When an article 13 has traversed the length of the inserter arm 9, FIG. 1, the article is inserted into plastic film 11. Preceding the insertion of article 13, tip 21 of retractable knife 23 cuts a slit 25 in the plastic film. Each article 13 has two notches 27, FIG. 2, to secure the article in the slit. The retractable knife 23 is adjustable along with the length of the frame 29 to suit various distances between articles.

Figure 7:
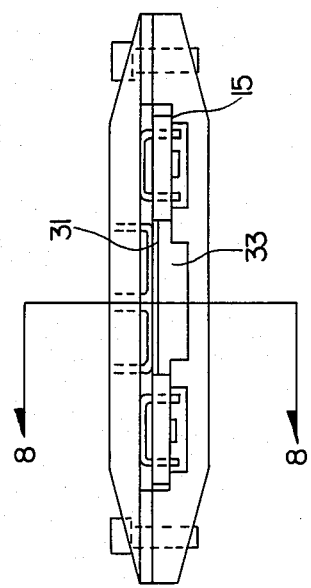
FIG. 7 of the drawings is a view similar to FIG. 6 illustrating a different embodiment of the apparatus in accordance with this invention.
Figure 8:
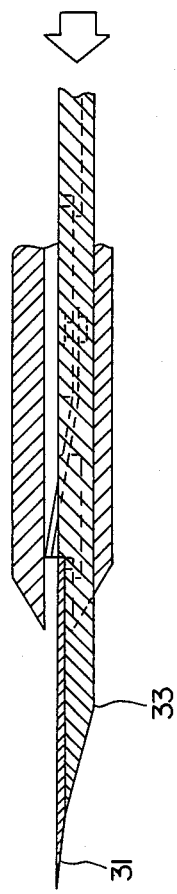
FIG. 8 of the drawings is a view along the line 8—8 of FIG. 7.

FIGS. 7 and 8 illustrate a further embodiment wherein a knife 31 allows the plastic film to be cut at the insertion point, eliminating the need to adjust a separate knife to suit various distances between cuts. Knife 31 is mounted on a knife pusher 33 which is timed to stroke independently of sub-blade 15.

In either embodiment, a detection beam 35, FIG. 1, detects any missing article which would indicate a jam requiring attention.

It is thus seen that the process and apparatus of this invention provide a novel and advantageous process and apparatus for dispensing and conveying plastic articles. It is further seen that the process and apparatus provide a unique and novel technique for the insertion of hooks into plastic film. As various other advantages and features will be apparent to those of skill in the art from a reading of the foregoing description which is exemplary in nature, such variations are included within the spirit and scope of the invention as defined by the following appended claims.

That which is claimed is:

1. An apparatus for dispensing articles from a cartridge of said articles, comprising:
    a magazine for receiving said cartridge;
    means for shearing individual articles from said cartridge;
    an inserter arm for receiving one of said articles as it is sheared;
    said inserter arm having a length which is a plurality of the length of said one article;
    means for advancing said article in increments of said length of said one article through said inserter arm;
    means for restraining said one article when it has advanced one of said increments; and
    means for receiving the next of said articles from said cartridge in said inserter arm and wherein said means for restraining said article is a ratchet-spring stopper located within said inserter arm.

2. The apparatus according to claim 7 further including a retractable knife about which folded plastic film passes before reaching said inserter arm to receive one of said articles at the end of said inserter arm.

3. The apparatus according to claim 2 wherein said retractable knife can be moved towards or away from said inserter arm depending on the distance required between said articles in said folded plastic film.

4. The apparatus according to claim 7 further including a retractable knife at the end of said inserter arm for cutting a slit in plastic film for said slit to receive one of said articles.

5. An apparatus for dispensing articles from a cartridge of said articles, comprising:
    a magazine for receiving said cartridge;
    means for shearing individual articles from said cartridge;

an inserter arm for receiving one of said articles as it is sheared;

said inserter arm having a length which is a plurality of the length of said one article;

means for advancing said article in increments of said length of said one article through said inserter arm;

means for restraining said one article when it has advanced one of said increments; means for receiving the next of said articles in said cartridge in the inserted arm; and wherein said means for advancing is a sub-blade, and a series of ratchet-spring pushers positioned on said sub-blade in the arm.

* * * * *

UNITED STATES PATENT AND TRADEMARK OFFICE
CERTIFICATE OF CORRECTION

PATENT NO. : 4,854,931
DATED : August 8, 1989
INVENTOR(S) : Roberts et al.

It is certified that error appears in the above-indentified patent and that said Letters Patent is hereby corrected as shown below:

Col. 4, line 52 delete "7" and insert --1--;

Col. 4, line 60 delete "7" and insert --1--.

Signed and Sealed this

Twentieth Day of December, 1994

Attest:

BRUCE LEHMAN

*Attesting Officer*     *Commissioner of Patents and Trademarks*